United States Patent [19]

Biller

[11] Patent Number: 4,962,747

[45] Date of Patent: Oct. 16, 1990

[54] SPEARGUN TRIGGER MECHANISM

[76] Inventor: Alfred B. Biller, 263 Strathmore La., Bloomingdale, Ill. 60108

[21] Appl. No.: 311,045

[22] Filed: Feb. 17, 1989

[51] Int. Cl.$^5$ .............................................. F41B 7/04
[52] U.S. Cl. ........................................ 124/40; 124/22
[58] Field of Search ............... 124/20 B, 22, 25, 31, 124/35 R, 27, 16, 17, 36, 40

[56] References Cited

U.S. PATENT DOCUMENTS

| | | | |
|---|---|---|---|
| 906,309 | 12/1908 | Schobbert | 124/40 X |
| 1,057,171 | 3/1913 | Redfield | 124/40 X |
| 2,905,167 | 9/1959 | Abrams et al. | 124/40 |
| 3,340,642 | 9/1967 | Vasiljevic | 124/22 |
| 3,490,429 | 1/1970 | Benedict | 124/25 |
| 3,872,853 | 3/1975 | Nakatani | 124/22 |
| 3,964,366 | 6/1976 | Atchisson | 124/40 X |
| 4,192,281 | 3/1980 | King | 124/25 |
| 4,479,480 | 10/1984 | Holt | 124/35 R |

Primary Examiner—Randolph A. Reese
Assistant Examiner—Jeffrey L. Thompson

[57] ABSTRACT

A trigger assembly for spearguns with a reversible safety and improved trigger pull. The safety has an operator that extends over the trigger area and is positioned so the fisherman's index finger can operate it while his hand is on the speargun grip.

10 Claims, 3 Drawing Sheets

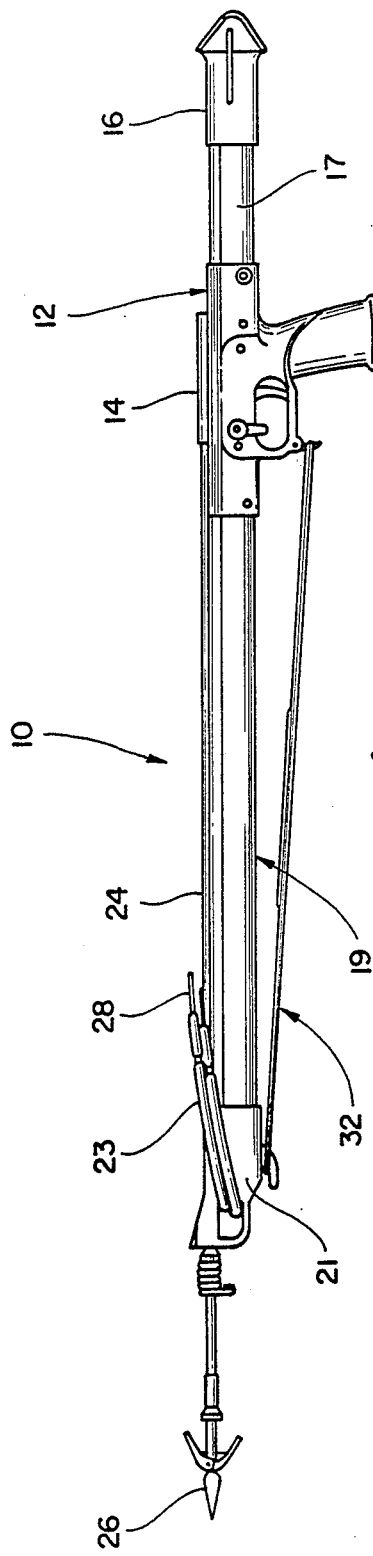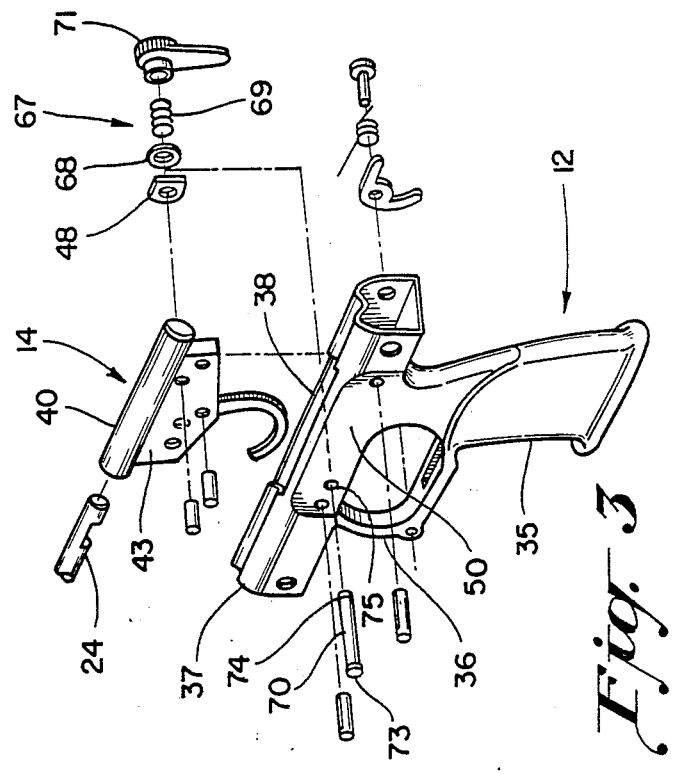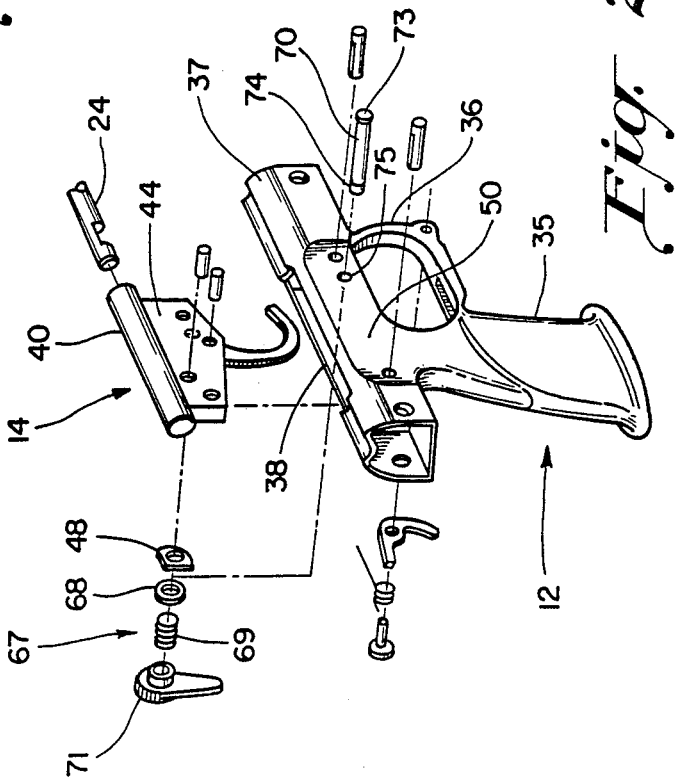

SPEARGUN TRIGGER MECHANISM

BACKGROUND OF THE INVENTION

Fishing spearguns have not changed dramatically over the last century in that they continue to employ spearpoint shafts that are biased into a trigger release mechanism by a plurality of rubber bands, and a string line for retrieving the spearpoint and shaft after firing.

Of course, modern manufacturing techniques have made improvements which have affected somewhat the appearance of the speargun, its safety and ease of cocking and trigger pull. For example, the grip assembly now includes, in one embodiment of the assignee of the present invention, a one-piece plastic housing that forms the handle grip, the trigger guard, the butt support, the forepiece support and the housing for the trigger assembly.

The trigger assembly has been improved by providing it with a removable frame that permits the trigger assembly to be easily removed from the grip housing. This prior trigger assembly includes a one-piece plastic frame having an upper spearpoint shaft guide and spaced parallel lower frames that pivotally support both the trigger and a shaft latching bar.

The trigger assembly is also provided with a safety pawl operated by a knob on the outside of the grip housing.

Since these spearguns have remained basically unchanged, performance improvements, although they may appear small, contribute greatly to the popularlity of the speargun in this fascinating, competitive and still somewhat esoteric sport.

In these prior trigger assemblies, the latch bar and the trigger slidably engage one another and are constructed of the same material and after a period of use, the inter-engaging surfaces become scored causing trigger pull to become erratic which results in a jerking movement of the gun during firing throwing the spear off target.

Another problem in these prior trigger assemblies is that the safety mechanism requires the use of the fisherman's other hand, or more particularly, with the fisherman's left hand on the grip housing handle, he either has to operate the safety release with his right hand or take his left hand off the grip to release it.

It is a primary object of the present invention to ameliorate the problems noted above in spearguns, and particularly speargun trigger assemblies.

SUMMARY OF THE PRESENT INVENTION

In accordance with the present invention, a trigger assembly is provided for a speargun that has a left-right reversible safety operable with the trigger hand while on the grip, and an improved trigger pull achieved by engaging bearing surfaces on the latch bar and trigger.

Toward these ends, the present speargun is provided with a one-piece grip housing in the general shape of the housing of an automatic pistol that has an upper slot into which a trigger assembly is insertable. The trigger assembly has a plastic frame with an integral top tube that receives the proximal end of the spearpoint shaft, and parallel spaced depending walls that pivotally support the trigger, the latch bar, and a safety pawl.

The latch bar has an upwardly projecting shaft locking pawl substantially in line with the pivotal axis of the locking pawl, and this location has the effect of reducing the outward shaft torque on the latch bar, and hence the trigger, reducing trigger pull effort by at least 32%.

The latch bar has an elongated arm that rests on a shoulder on the trigger in the set or firing position. The latch bar is constructed of hardened 17-7 stainless steel, while the trigger is constructed of 302 stainless, or equivalents thereof, resulting in a significant difference in hardness and creating a bearing effect between the latch bar arm and the trigger shoulder eliminating the prior problem of scoring on these surfaces and thereby smoothing out trigger pull substantially.

The safety pawl, according to the present invention, is operated by a knob and shaft assembly projecting through the grip housing and the trigger frame. The knob has a radially extending finger that is positioned so that when the safety is "on" with the latch bar holding the spearpoint shaft in a firing position, this finger depends over the trigger blocking movement of the fisherman's index finger toward the trigger. This is especially important in spearguns because underwater conditions make it difficult to visually observe whether the safety is "on" or "off".

After recognizing a safety "on" condition, the fisherman, with his trigger hand on the housing grip, releases the safety with this index finger of his trigger hand by rotating the knob finger clockwise toward a horizontal position away from the trigger, rotating the safety pawl away from the trigger creating a firing condition.

The safety knob and shaft assembly is insertable through the safety pawl from either the right or left side of the grip housing permitting the safety to be used with the trigger hand on the grip for both right or left side spear fishermen.

Other objects and advantages of the present invention will appear more clearly from the following detailed description.

BRIEF DESCRIPTION OF THE DRAWINGS

FIG. 1 is a side view of a speargun with its safety in an "on" position;

FIG. 2 is an exploded perspective of the grip housing and trigger assembly arranged for left side shooting;

FIG. 3 is an exploded perspective of the same grip housing and trigger assembly arranged for right side shooting;

DETAILED DESCRIPTION OF THE PREFERRED EMBODIMENT

Figure 4:
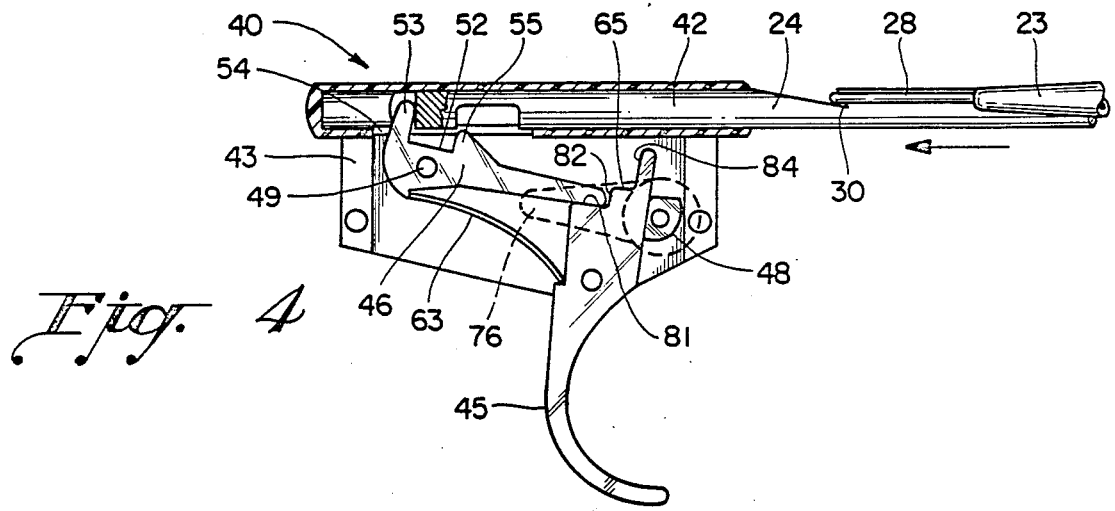
FIGS. 4, 5 and 6 are longitudinal sections of the trigger assembly respectively in the loading, safety "on" and firing positions.

Referring to the drawings and particularly FIGS. 1 to 3, a speargun assembly 10 is illustrated according to the present invention generally including a grip housing 12, a trigger assembly 14, a butt rest 16 supported in grip housing 12 by butt extension 17, a wooden forepiece 19 supported in the forward end of grip housing 12, a muzzle piece 21 supported on forepiece 19, and a pair of bands 23 of natural rubber shown in their relaxed positions which are adapted to engage spearpoint shaft 24 in preparation for firing, which carries a spearpoint 26 at its distal end.

Bands 23 carry metal loops 28 adapted to engage in grooves 30 in the top of spearpoint shaft 24 as seen clearly in FIG. 4.

Referring again to FIG. 1, a line assembly 32 is provided for retrieving the spearpoint 26 and shaft after firing.

As seen in FIGS. 2 and 3, the grip housing 12 is a one-piece plastic molding in the general shape of an automatic pistol having a hollow handle 35, a trigger guard 36, and a tubular upper receiver 37, whose forward end supports forepiece 19 and rear end supports butt extension 17. Trigger assembly 14 is insertable into an elongated slot 38 in the top of receiver 37.

Figure 5:
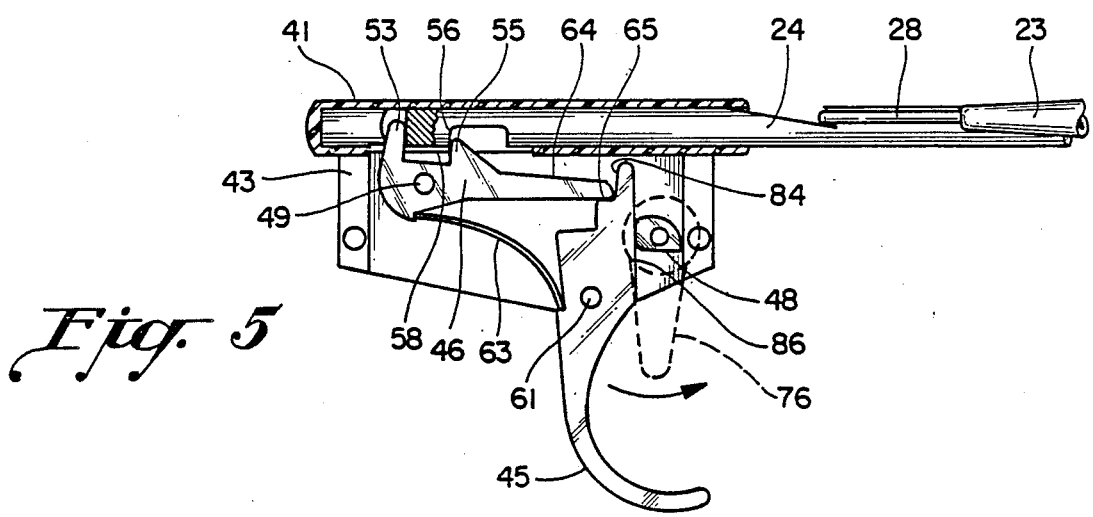
Figure 6:
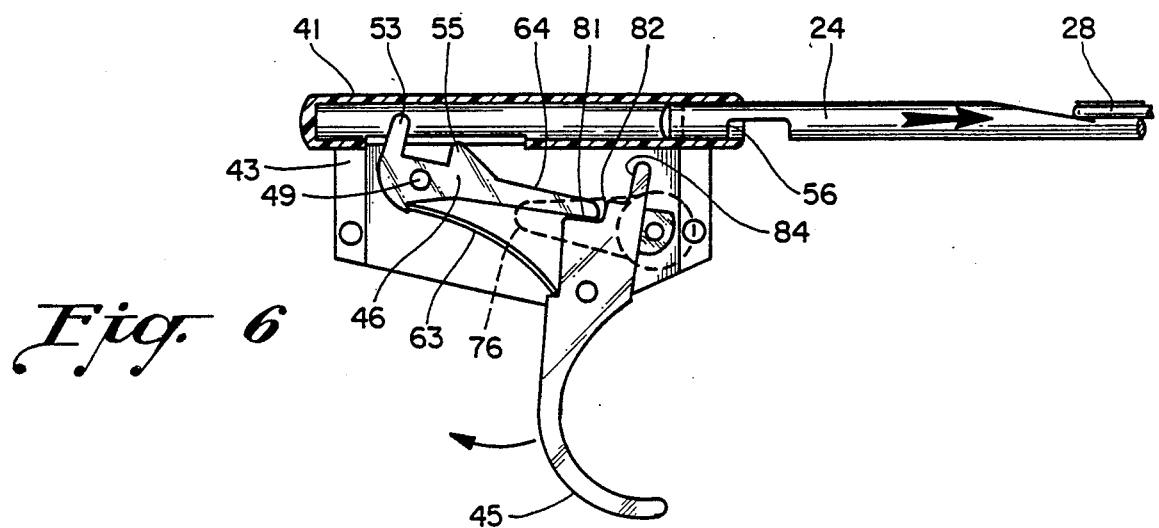

The trigger assembly 14 includes a reenforced nylon plastic frame 40 seen more clearly in FIGS. 4 to 6. Frame 40 is a one-piece plastic injection molding having an integral upper guide tube 41 that slidably receives proximal end 42 of spearpoint shaft 24. Frame 40 has a pair of parallel spaced depending side walls 43 and 44 that pivotally support trigger 45, latch bar 46, and safety pawl 48.

The latch bar 46 is a one-piece 17-7 hardened stainless steel part pivotally supported between walls 43 and 44 by a pin 49 that extends through walls 43 and 44 but not through receiver side walls 50, as seen in FIGS. 2 and 3 so that it does not have to be removed to remove trigger assembly 14 from receiver 37.

The latch bar 46 has a rectangular recess 52 that defines a reset pawl 53 extending into guide tube 41 through slot 54. Pawl 53 is engaged by the proximal end 42 of the spearpoint shaft as the shaft is loaded into the guide tube 41.

Recess 52 also defines a second pawl 55 on the latch bar that in its set position illustrated in FIG. 5 engages a shoulder 56 in a recess in the bottom of spearpoint shaft proximal end 42 to hold the spearpoint shaft in a firing ready position.

An important aspect of the present invention is that locking surface 58 of locking pawl 55 is vertically substantially in line with the side of pivot pin 49 which has the effect of reducing the torque on latch bar 46 caused by the spearpoint shaft in the loaded position illustrated in FIG. 5.

One-piece trigger 45 is constructed of 302 stainless steel and is pivotally mounted between trigger frame walls 43 and 44 by pin 61, and a leaf spring 63 is provided which engages shoulders on the latch bar and trigger to maintain them in engagement after firing as seen in FIG. 6.

The latch bar 46 has a forwardly extending arm 64 that engages a generally horizontal shoulder 65 on trigger 45 in the firing position of the latch bar illustrated in FIG. 5.

Another important aspect of the present invention is that because the latch bar 46 and the trigger 45 are constructed of substantially disparate hardness materials, the interengaging surfaces of shoulder 65 and the bottom surface of latch bar arm 64 create a bearing condition between the surfaces that substantially eliminates scoring of these surfaces and yields a vastly enhanced trigger pull.

As seen in FIGS. 2 and 3, a safety assembly 67 is provided that includes the pawl 48, spacing ring 68, spring 69, shaft 70 and operator knob 71.

Shaft 70 has a length sufficient to extend through spaced apertures 72 in side walls 43 and 44 and through receiver side walls 50 with one end projecting about 0.75 inches.

The inner end 73 of shaft 70 is deformed to prevent it from sliding through receiver side apertures 75. The opposite end 74 of shaft 70 carries a removable snap ring that retains ring 68, spring 69 and knob 71 on shaft 70.

Shaft 70 is freely slidable in receiver apertures 75 and trigger frame apertures 72 so that the entire trigger safety assembly 67 can be easily removed by removing the snap ring, ring 68, spring 69 and knob 71 from end 74 and sliding shaft 70 from the other side of the grip housing 12. In this way the safety assembly 67 can be mounted in either its left orientation illustrated in FIG. 2, or its right illustrated in FIG. 3 for left side or right side shooting.

Figure 7:
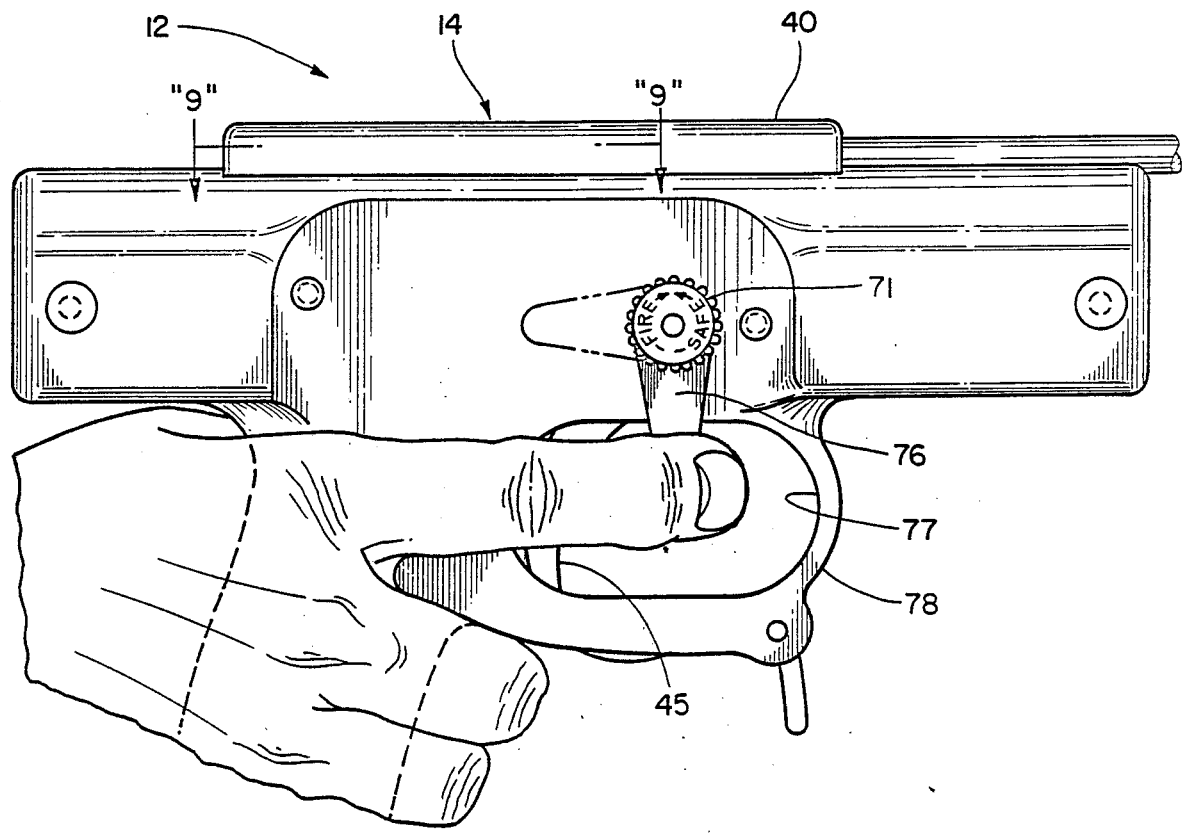
FIG. 7 is an enlarged fragmentary side view of the grip housing illustrating the safety knob in a safety "on" position.
Figure 8:
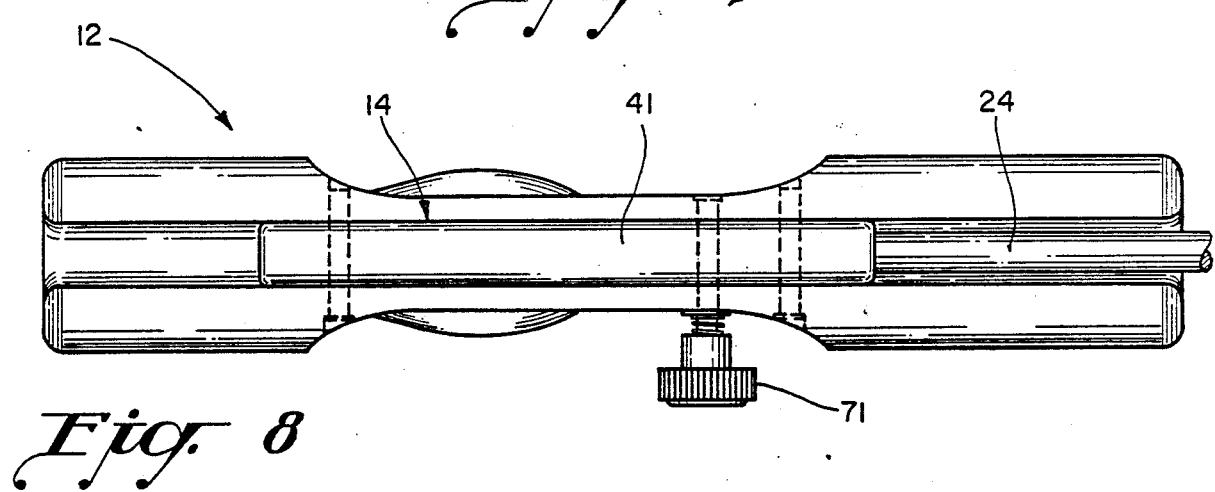
FIG. 8 is a top view of the grip housing shown in FIG. 7.
Figure 9:
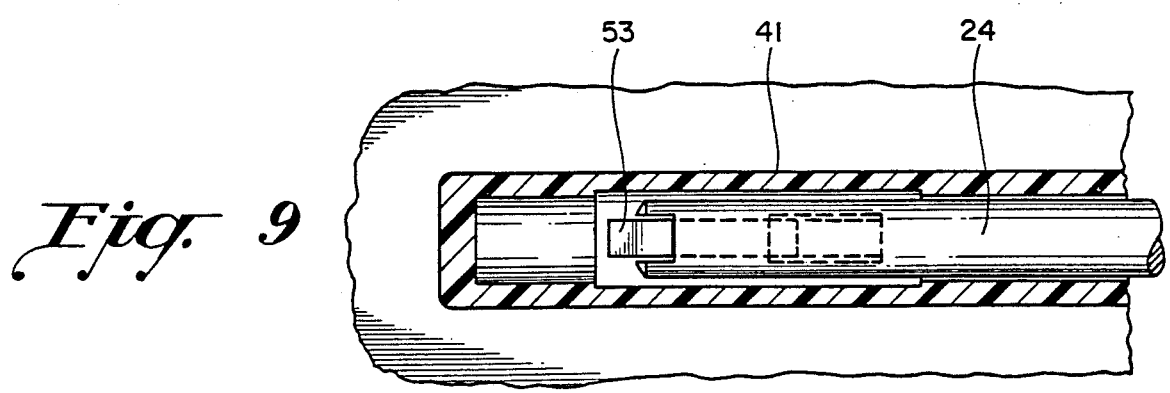
FIG. 9 is a partly fragmented top view of the grip housing showing the latching bar engaging the spearpoint shaft's proximal end.

As seen clearly in FIGS. 2, 3, 7 and 8, the safety operator knob 71 has a tapered radially extending integral arm or finger 76 that depends substantially over opening 77 in trigger guard 78 so that the fisherman readily engages it as he approaches trigger 45 with his trigger finger, as clearly seen in FIG. 7. With the trigger hand on the grip handle 35, safety finger or arm 76 is rotated from its "on" position illustrated in solid lines in FIG. 7, to the horizontal dotted line position with the trigger hand forefinger.

Referring to FIGS. 4, 5 and 6, spearpoint shaft 24 is loaded by inserting it into guide tube 41 engaging projection 54, rotating latch bar 46 counter-clockwise against the biasing force of spring 63 away from transverse trigger shoulders 81 and 82 permitting trigger 45 to pivot counter-clockwise to its position illustrated in FIG. 5 where latch bar arm 64 engages transverse trigger shoulders 65 and 84 stopping further counter-clockwise movement of trigger 54. In this position of latch bar 46, pawl 55 engages shaft shoulder 56 preventing outward movement of spearpoint shaft 24 from guide tube 41.

With his trigger hand forefinger, the fisherman engages safety arm 76 and rotates it from its FIG. 4 position to its FIG. 5 "on" position where safety pawl 48 engages trigger side 86 preventing trigger firing.

When commencing firing, the trigger hand forefinger again engages safety knob arm 76 and rotates it clockwise back to its horizontal position illustrated in FIG. 6, its "off" position, permitting trigger 45 to be pulled to its fired position illustrated in FIG. 6 permitting latch bar 46 to pivot clockwise releasing locking pawl 55 from shaft shoulder 56, permitting bands 23 to fire shaft 24 from the speargun.

I claim:

1. A grip assembly for a fishing speargun, comprising: a grip housing having a handle, a trigger assembly removably received in the grip housing with a frame, said frame having guide means for receiving the proximal end of a spearpoint shaft, a trigger pivotally mounted in the trigger frame, a latch bar pivotally mounted in the frame having a set position and a reset projection engageable by the spearpoint shaft proximal end as the shaft is inserted into the frame guide means, said latch bar also having a pawl when in its set position engageable with the shaft proximal end for holding the shaft in a set position in the guide means against the force of firing bands pulling on the shaft, said trigger being selectively operable to hold the latch bar in its set position and to release the latch bar as the trigger is pulled, a pivotal safety pawl selectively engageable with one of the trigger and latch bar to selectively prevent movement of the latch bar from its set position, and a pivotal operator for the safety pawl positioned outside the grip housing having a radially extending projection constructed to be operated by the fisherman's trigger hand while on the grip handle, said operator projection being moveable directly adjacent the trigger so it may be operated by the fisherman's fingers on the trigger hand, said operator projection being spaced laterally from the trigger, said operator projection having a set position extending generally downwardly and a release position extending generally rearwardly so the front of the finger is used to release the safety pawl.

2. A grip assembly for a fishing speargun, comprising: a grip housing having a handle, a trigger assembly removably received in the grip housing with a frame, said frame having guide means for receiving the proximal end of a spearpoint shaft, a trigger pivotally mounted in the trigger frame, a latch bar pivotally mounted in the frame having a set position and a reset projection engageable by the spearpoint shaft proximal end as the shaft is inserted into the frame guide means, said latch bar also having a pawl when in its set position engageable with the shaft proximal end for holding the shaft in a set position in the guide means against the force of firing bands pulling on the shaft, said trigger being selectively operable to hold the latch bar in its set position and to release the latch bar as the trigger is pulled, a pivotal safety pawl selectively engageable with one of the trigger and latch bar to selectively prevent movement of the latch bar from its set position, and a pivotal operator for the safety pawl positioned outside the grip housing having a radially extending projection constructed to be operated by the fisherman's trigger hand while on the grip handle, the safety operator radial projection having an "on" position generally transverse to the spearpoint shaft and an "off" position generally parallel to the spearpoint shaft.

3. A grip assembly for a fishing speargun, comprising: a grip housing having a handle, a trigger assembly removably received in the grip housing with a frame, said frame having guide means for receiving the proximal end of a spearpoint shaft, a trigger pivotally mounted in the trigger frame, a latch bar pivotally mounted in the frame having a set position and a reset projection engageable by the spearpoint shaft proximal end as the shaft is inserted into the frame guide means, said latch bar also having a pawl when in its set position engageable with the shaft proximal end for holding the shaft in a set position in the guide means against the force of firing bands pulling on the shaft, said trigger being selectively operable to hold the latch bar in its set position and to release the latch bar as the trigger is pulled, a pivotal safety pawl selectively engageable with one of the trigger and latch bar to selectively prevent movement of the latch bar from its set position, and a pivotal operator for the safety pawl positioned outside the grip housing having a radially extending projection constructed to be operated by the fisherman's trigger hand while on the grip handle, the radially extending shaft operator projection being constructed to block the user's trigger hand index finger as it attempts to engage the trigger, said trigger being mounted in a plane central and parallel to the grip housing, said operator projection being mounted laterally spaced from the trigger and sufficiently long so it blocks the user's index finger before it reaches the plane of the trigger.

4. A grip assembly for a fishing speargun, comprising: a grip housing having a handle, a trigger assembly removably received in the grip housing with a frame, said frame having guide means for receiving the proximal end of a spearpoint shaft, a trigger pivotally mounted in the trigger frame, a latch bar pivotally mounted in the frame having a set position and a reset projection engageable by the spearpoint shaft proximal end as the shaft is inserted into the frame guide means, said latch bar also having a pawl when in its set position engageable with the shaft proximal end for holding the shaft in a set position in the guide means against the force of firing bands pulling on the shaft, said trigger being selectively operable to hold the latch bar in its set position and to release the latch bar as the trigger is pulled, a pivotal safety pawl selectively engageable with one of the trigger and latch bar to selectively prevent movement of the latch bar from its set position, a pivotal operator for the safety pawl positioned outside the grip housing, the radially extending shaft operator projection blocking the user's trigger hand index finger as it attempts to engage the trigger, and the safety operator radial projection having an "on" position generally transverse to the spearpoint shaft and an "off" position generally parallel to the spearpoint shaft.

5. A grip assembly for a fishing speargun as defined in claim 4, wherein the safety operator radial projection is positioned adjacent the trigger to be operated by the fisherman's index finger on the trigger hand while on the grip handle.

6. A grip assembly for a fishing speargun, comprising: a grip housing having a handle, a trigger assembly removably received in the grip housing with a frame, said frame having guide means for receiving the proximal end of a spearpoint shaft, a trigger pivotally mounted in the trigger frame, a latch bar pivotally mounted in the frame having a set position and reset projection engageable by the spearpoint shaft proximal end for holding the shaft in a set position in the guide means against the force of firing bands pulling on the shaft, said trigger being selectively operable to hold the latch bar in its set position and to release the latch bar as the trigger is pulled, a pivotal safety pawl selectively engageable with one of the trigger and latch bar to selectively prevent movement of the latch bar from its set position, a pivotal operator for the safety pawl positioned outside the grip housing having a radially extending projection constructed to be operated by the fisherman's trigger hand while on the grip handle, said safety operator being selectively insertable in opposite sides of the grip housing so it can be operated by the trigger hand of both left and right eyed fishermen, said operator projection being moveable directly adjacent the trigger so it may be operated by the fisherman's fingers on the trigger hand.

7. A grip assembly for a fishing speargun, comprising: a grip housing having a handle, a trigger assembly removably received in the grip housing with a frame, said frame having guide means for receiving the proximal end of a spearpoint shaft, a trigger pivotally mounted in the trigger frame, and a latch bar pivotally mounted in the frame having a set position and reset projection engageable by the spearpoint shaft proximal end as the shaft is inserted into the frame guide means, said latch bar also having a pawl when in its set position engageable with the shaft proximal end for holding the shaft in a set position in the guide means against the force of firing bands pulling on the shaft, said trigger being selectively operable to hold the latch bar in its set position and to release the latch bar as the trigger is pulled, said trigger having a recess engageable with an arm on the latch bar in its set position, said latch bar having a pivotal axis in the trigger frame, said latch bar pawl having a latching surface being in substantial alignment with the latch bar pivotal axis to reduce trigger pressure, said safety operator being selectively insertable in opposite sides of the grip housing so it can be operated by the trigger hand of both left and right eyed fishermen.

8. A grip assembly for a fishing speargun, comprising: a grip housing having a handle, a trigger assembly removably received in the grip housing with a frame, said frame having guide means for receiving the proximal end of a spearpoint shaft, a trigger pivotally mounted in the trigger frame, and a latch bar pivotally mounted in the frame having a set position and reset projection engageable by the spearpoint shaft proximal end as the shaft is inserted into the frame guide means, said latch bar also having a pawl when in its set position engageable with the shaft proximal end for holding the shaft in a set position in the guide means against the force of firing bands pulling on the shaft, said trigger being selectively operable to hold the latch bar in its set position and to release the latch bar as the trigger is pulled, said trigger having a recess engageable with an arm on the latch bar in its set position, said trigger recess slidably engaging the latch bar arm as the trigger is pulled, said latch bar arm and trigger recess having substantially different hardness to create bearing surfaces therebetween and a smooth trigger pull.

9. A grip assembly for a fishing speargun as defined in claim 8, wherein the latch bar is an equivalent of 17-7 stainless steel and the trigger is an equivalent of 302 stainless steel.

10. A grip assembly for a fishing speargun, comprising: a grip housing having a handle, a trigger assembly removably received in the grip housing with a frame, said frame having guide means for receiving the proximal end of a spearpoint shaft, a trigger pivotally mounted in the trigger frame, and a latch bar pivotally mounted in the frame having a set position and reset projection engageable by the spearpoint shaft proximal end as the shaft is inserted into the frame guide means, said latch bar also having a pawl when in its set position engageable with the shaft proximal end for holding the shaft in a set position in the guide means against the force of firing bands pulling on the shaft, said trigger being selectively operable to hold the latch bar in its set position and to release the latch bar as the trigger is pulled, said trigger having a recess engageable with an arm on the latch bar in its set position, said trigger recess slidably engaging the latch bar arm as the trigger is pulled, said latch bar arm and trigger recess having substantially different hardness to create bearing surfaces therebetween and a smooth trigger pull, and a pivotal operator for the safety pawl positioned outside the grip housing having a radially extending projection constructed to be operated by the fisherman's trigger hand while on the grip handle, the safety operator radial projection having an "on" position generally transverse to the spearpoint shaft and an "off" position generally parallel to the spearpoint shaft, the radially extending shaft operator projection blocking the user's trigger hand index finger as it attempts to engage the trigger, said safety operator being selectively insertable in opposite sides of the grip housing so it can be operated by the trigger hand of both left and right eyed fishermen, said trigger having a recess engageable with an arm on the latch bar to hold the latch bar in its set position, said latch bar having a pivotal axis in the trigger frame, said latch bar pawl being in substantial alignment with the latch bar pivotal axis to reduce trigger pressure, said trigger recess slidably engaging the latch bar arm as the trigger is pulled, said latch bar arm and trigger recess having substantially different hardness to create bearing surfaces therebetween and a smooth trigger pull.

* * * * *